United States Patent [19]

Gehlert

[11] 4,322,031
[45] Mar. 30, 1982

[54] CONTROL FOR SANITARY MIXING VALVE

[75] Inventor: Kurt Gehlert, Iserlohn, Fed. Rep. of Germany

[73] Assignee: H. D. Eichelberg & Co. GmbH, Iserlohn, Fed. Rep. of Germany

[21] Appl. No.: 160,250

[22] Filed: Jun. 17, 1980

[30] Foreign Application Priority Data

Jun. 22, 1979 [DE] Fed. Rep. of Germany ....... 2925234

[51] Int. Cl.³ .................... G05D 23/00; D06F 33/00
[52] U.S. Cl. .................................. 236/12 R; 68/12 R
[58] Field of Search ......................... 236/12.12, 12.11; 68/12 R; 137/3-6; 36/109; 165/12; 65/231

[56] References Cited

U.S. PATENT DOCUMENTS 3,581,984 6/1971 Buechner ............................... 236/12
3,942,718 3/1976 Palmieri ............................. 236/78 R 4,071,745 1/1978 Hall ................................... 165/22 X Primary Examiner—William E. Wayner
Attorney, Agent, or Firm—Allison C. Collard; Thomas M. Galgano

[57] ABSTRACT

A control for a sanitary mixing valve, includes an electric motor drive for the mixing water-control member in the mixing valve and a temperature sensor for measuring the discharge temperature of the mixed water. The analog values obtained by the temperature sensor are digitally converted and are fed to an electronic control means provided for one or a plurality of such mixing valves. The control means compares these values with previously determined nominal values of one or a plurality of nominal value transmitters and controls the electric motor drive based upon the corresponding value differentials.

4 Claims, 1 Drawing Figure

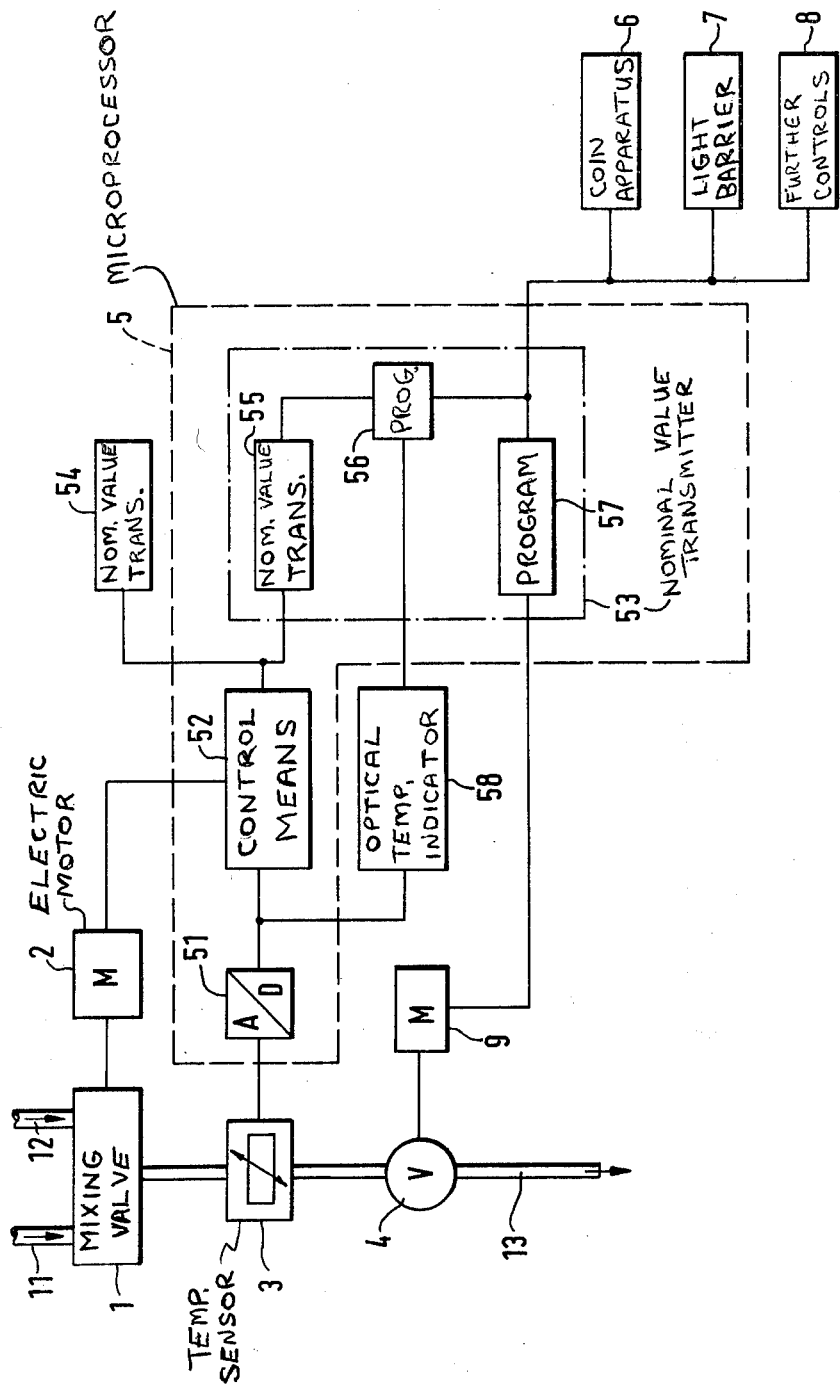

CONTROL FOR SANITARY MIXING VALVE

The present invention relates to a control for a sanitary mixing valve. More particularly, it relates to an electronic temperature and quantity control for such a valve.

Mixing valves for sanitary installations such as bathrooms, medical bathing installations, or the like, are manually controlled by means of piston or disk controls. Normally, the hot and cold water is fed in oppositely-control-led quantities to the mixing chamber. The total quantity control is carried out at the mixed water discharge outlet.

Thermostatic valves are known, for example, for showers or the like, wherein an automatic mixing temperature is maintained by means of expansion elements, after a predetermined mixing temperature is reached.

It is an object of the invention to provide an electronic temperature control and, if need be, a quantity control for a sanitary mixing valve, so as to afford a substantially automatic, yet variable, mixing water control.

This object of the invention is obtained according to the invention by the provision of a control which is characterized by an electric motor drive for the mixing water-control member in the mixing valve and a temperature sensor for monitoring the discharge temperature of the mixed water. The analog values obtained by the temperature sensor are digitally converted and are fed to an electronic control means provided for one or a plurality of such mixing valves. The control means compares these values with previously determined nominal values of one or a plurality of nominal value transmitters and controls the electric motor drive based upon the corresponding value differentials.

In accordance with a preferred embodiment of the invention, the nominal values are adjustable by a program control in a temperature and/or time dependent manner.

Microprocessors, for example, in the form of an integrated circuit with at least one analog-digital converter, a control means and a manual nominal value transmitter and/or an electronic data logger or counter with a program register or counter as the nominal value transmitter, permit the economical use of such electronic controls, in accordance with the state of the art. The invention permits the use of many possibilities of time-, temperature-, and quantity-dependent control of the mixing water discharging from the mixing valve. In particular, such controls permit the therapeutic use of sanitary installations which are controlled by the inventive concept. The control permits the use of known energy and/or water saving mixing values.

Control programs which are superimposed on the nominal value transmitter permit a cyclical change of the mixing water temperature, an adjustable decrease and/or increase in the speed of change of the water discharge temperature and variable interval times, as well as a time-variable water discharge quantity control. Such integrated electronic circuits may be realized by a single microprocessor chip, for example. Such a microprocessor may carry out the different control processes in sanitary installations simultaneously by a manual control or may be program controlled with respect to heating functions, light installations, or the like. For cost reducing reasons, it may be essential to couple the microprocessor with a plurality of mixing valves and other devices to be controlled.

The invention also includes specific methods for controlling the proposed control of a mixing valve. Of foremost importance is a control method wherein the water discharge temperature oscillates in a time cycle around a determined mean value with adjustable amplitudes. In addition, the interval time between the temperature changes is manually adjustable or is program controlled. For medical treatments, a control method may be of interest having a program-controlled pulsating change of the water discharge quantity. For example, in public bath installations the inventive electronic control of the microprocessor may be coupled with an independent or integrated time cycle transmitter, for example, a coin-operated apparatus, whereby in such a control an additional known light (or photosensitive) barrier may be incorporated for economical energy saving reasons.

The invention thus affords controls for mixing valves wherein only the mixing water temperature is controlled, as well as controls with the most complicated time, temperature and quantity dependent control processes in conjunction with other simultaneous program-controlled processes of the total installation.

Other objects and features of the present invention will become apparent from the following detailed description when taken in connection with the accompanying drawing which discloses one embodiment of the invention. It is to be understood that the drawing is designed for the purpose of illustration only, and is not intended as a definition of the limits of the invention.

The drawing is a block diagram of an electronic control for a mixing valve embodying the present invention.

Referring now in detail to the drawing, a mixing water control member (not shown) of a mixing valve 1 is controlled by an electric motor 2. Cold and hot water is fed through inlets 11 and 12, respectively, to mixing valve 1. A temperature sensor 3 is incorporated in the mixing water discharge outlet or line 13. The temperature values which are measured by the temperature sensor 3 are digitally converted in an analog-digital converter 51 of a microprocessor 5, which is shown in its entirety in dotted lines in the drawing. These digital measuring values are compared in the control means 52 with the nominal values of a nominal value transmitter 54 or 55; the nominal values being fed either manually or by programs into the nominal value transmitter 54 or 55, respectively. Motor drive 2 is controlled by the corresponding differential values through control means 52.

If a black-out should occur, the mixing valve may also be controlled by an auxiliary or dual mechanical control (not shown) which serves as a back-up to the electric motor drives 2 and 9.

Microprocessor 5 may be a so-called single-chip microprocessor in the form of an integrated circuit (IC) comprising an analog-digital converter 51, control means 52, a manual nominal value transmitter 54 and an electronic data logger with a program as the nominal value transmitter 53.

Programs 55, 56 for different temperature controls (e.g., amplitude, and frequency, time invervals) and for the quantity control 57, 56 may be stored in the nominal value transmitter 53 (shown in dash-dotted lines in the drawing in its entirety). Nominal value transmitter 53 may be coupled with an independent time cycle transmitter, for example, a coin time apparatus 6 and with a light barrier (photosensitive barrier) 7, and, if so desired, with further control elements 8 outside of the mixing valve.

An optical temperature indicator 58 may be carried out by processor 5 and shown on an indicator field. This digital field may also be used for time indication. A program-controlled mixing water quantity control may also be carried out by the microprocessor, whereby a valve 4 driven by electric motor 9 is controlled.

The control of other devices in the area of sanitary installations is made possible in many variations when using the microprocessor.

Thus, while only one embodiment of the present invention has been shown and described, it will be obvious that many changes and modifications may be made thereunto, without departing from the spirit and scope of the invention.

What is claimed is:

1. A control for a sanitary mixing valve having a mixing water control member, comprising:
   an electric motor for controlling and driving said control member of said mixing valve;
   a temperature sensor for monitoring the discharge temperature of the mixed water;
   a microprocessor chip in the form of an integrated circuit which comprises an analog-digital converter for receiving the analog values of the sensor and converting the same to digital signals, electronic control means for receiving the digital signals from said analog-digital converter, comparing them with predetermined nominal values and controlling said electric motor based upon the corresponding value differentials a nominal value transmitter including an electronic data logger, and program control means for adjusting the nominal values in a temperature and/or time dependent manner so that through the differential values between the digital measuring values and digital nominal values, the mixing water temperature is controllable in a cyclical oscillating manner about a preadjusted mean value with adjustable amplitudes.

2. The control according to claim 1, wherein said nominal value transmitter is coupled with an internal time cycle transmitter.

3. The control according to claim 1, additionally including mixing water quantity control means which is program controlled by said electronic control means.

4. In a method for operating a sanitary mixing valve having a mixing water control member of the type including an electric motor for controlling and driving said control member of said mixing valve, a temperature sensor for monitoring the discharge temperature of the mixed water, an analog-digital converter for receiving the analog values of the sensor and converting the same to digital signals, and electronic control means for receiving the digital signals from said analog-digital converter, comparing them with predetermined nominal values and controlling said electric motor based upon the corresponding value differentials, the improvement comprising the steps of:
   oscillating the water discharge temperature in a time cycle around a preadjusted mean value with adjustable amplitudes.

* * * * *